United States Patent [19]

Black et al.

[11] Patent Number: 5,756,136
[45] Date of Patent: May 26, 1998

[54] CONTROLLED RELEASE ENCAPSULATION COMPOSITIONS

[75] Inventors: Mark Black, Bel Air; Lewis M. Popplewell, Cockeysville; Michael A. Porzio, Monkton, all of Md.

[73] Assignee: McCormick & Company, Inc., Sparks, Md.

[21] Appl. No.: 458,289

[22] Filed: Jun. 2, 1995

[51] Int. Cl.$^6$ .................................................. A21D 2/00
[52] U.S. Cl. .................. 426/89; 426/96; 426/534; 426/536; 426/650; 426/651; 426/657
[58] Field of Search ........................ 426/549, 650, 426/61, 89, 96, 534, 651, 62, 536, 656, 657

[56] References Cited

U.S. PATENT DOCUMENTS

| | | |
|---|---|---|
| 1,696,419 | 12/1928 | Staudinger et al. |
| 2,809,895 | 10/1957 | Swisher |
| 2,856,291 | 10/1958 | Schultz |
| 2,857,281 | 10/1958 | Schultz et al. |
| 3,314,803 | 4/1967 | Dame et al. |
| 3,410,180 | 11/1968 | Spangler et al. |
| 3,655,397 | 4/1972 | Parliment et al. |
| 3,704,137 | 11/1972 | Beck |
| 3,783,163 | 1/1974 | Patel |
| 3,821,447 | 6/1974 | Jasovsky et al. |
| 3,852,481 | 12/1974 | Feldman et al. |
| 3,857,964 | 12/1974 | Yolles |
| 3,873,746 | 3/1975 | Mahlmann |
| 3,922,375 | 11/1975 | Dalan et al. |
| 3,971,852 | 7/1976 | Brenner et al. |
| 3,979,528 | 9/1976 | Mahlmann |
| 3,985,910 | 10/1976 | Kirkpatrick |
| 3,989,852 | 11/1976 | Palmer |
| 3,991,223 | 11/1976 | Baron et al. |
| 4,004,039 | 1/1977 | Shoaf et al. |
| 4,007,291 | 2/1977 | Siedlecki et al. |
| 4,008,340 | 2/1977 | Kung et al. |
| 4,044,167 | 8/1977 | Jolly et al. |
| 4,230,687 | 10/1980 | Sair et al. |
| 4,232,047 | 11/1980 | Sair et al. |
| 4,289,794 | 9/1981 | Kleiner et al. |
| 4,335,149 | 6/1982 | Stipp |
| 4,378,380 | 3/1983 | Scarpellino et al. |
| 4,508,745 | 4/1985 | Fulger et al. |
| 4,520,033 | 5/1985 | Tout |
| 4,532,145 | 7/1985 | Saleeb et al. |
| 4,551,345 | 11/1985 | Davidescu et al. |
| 4,556,575 | 12/1985 | Katz et al. |
| 4,574,089 | 3/1986 | Musto et al. |
| 4,608,340 | 8/1986 | Szajani et al. |
| 4,610,890 | 9/1986 | Miller et al. |

(List continued on next page.)

FOREIGN PATENT DOCUMENTS

| | | |
|---|---|---|
| 0 010 804 | 5/1980 | European Pat. Off. |
| 0 353 806 | 2/1990 | European Pat. Off. |
| 43 506 | 12/1976 | Israel |
| 1 249 250 | 10/1971 | United Kingdom |
| WO 93/19622 | 10/1993 | WIPO |
| WO 94/06308 | 3/1994 | WIPO |

OTHER PUBLICATIONS

Levine et al., "Glass transitions in Foods", pp. 83–221 in *Physical Chemistry of Foods*, H.G. Schwartzberg and R.G. Hartel, Eds., Marciel Dekker, New York 1992.

Levine et al., "Water as a Plasticizer: physico–chemical aspects of low–moisture polymeric systems", pp. 79–185 in *Water Science Reviews*, vol. 3, Franks ed., Cambridge University Press, London 1988.

S. Heath, *Source Book of Flavors*, Avi Publishing Co., Westport, CT, 1981, pp. 148–287.

Ross et al., *J. Food Science*, vol. 56, No. 6, pp. 1676–1681, (1991).

Young et al., Microencapsulating Properties of Whey Proteins, *J. Dairy Sci.* 76:2868–2877 (1993).

Kirk–Othmer, *Encyclopedia of Chemical Technology*, 4th Ed., Wiley, New York, vol. 3, pp. 876–892 (1992).

Kirk–Othmer, *Encyclopedia of Chemical Technology*, 3rd Ed., Wiley, New York, vol. 15, pp. 522–570 (1981).

J. A. Maga, et al. *Dev. Food Sci.*, vol. 29, pp. 519–525 (1992).

A. P. Hansen et al, *J. Dairy Sci.*, vol. 74, pp. 2936–2940 (1991).

S. L. Young et al. *J. Dairy Sci.*, vol. 76, pp. 2878–2885 (1993).

P. K. W. Ng et al, *Journal of Food Sci.*, vol. 54, pp. 105–107 (1989).

T. E. O'Neill et al, *J. Agric. Food Chem.*, vol. 35, pp. 770–774 (1987).

A. P. Hansen et al, *ACS Symposium Series: Barrier Polymer Structure*, ACS, Washington, DC, Chapter 17, pp.318–332 (1990).

T. E. O'Neill et al, *Journal of Food Sci.*, vol. 52, pp. 98–101 (1987).

D. L. Moreau et al, *Food Structure*, vol. 12, pp. 457–468, (1993) (Abstract only).

T. E. O'Neill et al, *J. Food Sci.*, vol. 53, pp. 906–909 (1988) (Abstract only).

S. R. Noar, *Dissertation Abstracts Int.*, B, vol. 46(9) 2893 (1986) order No. DA8525804 (Abstract only).

J. P. Dumont et al, *J. Agric. Food Chem.*, vol. 34, pp. 1041–1045 (1986) (Abstract only).

E. Jasinski et al, *Milchwissenschaft*, vol. 40, pp. 596–599 (1985) (Abstract only).

O. E. Mills et al, *Lebensm.–Wiss.*, vol.17, pp. 331–335 (1984) (Abstract only).

S. Arai et al, *Agricultural and Biological Chemistry*, vol. 34, pp. 1569–1573 (1970) (Abstract only).

*Primary Examiner*—Leslie Wong
*Attorney, Agent, or Firm*—Oblon, Spivak, McClelland, Maier & Neustadt, P.C.

[57] ABSTRACT

Encapsulation of a flavor or active agent in a matrix of whey protein yields an encapsulation composition which results in the controlled release of the flavor or active agent and which may be incorporated in a yeast-leavened dough without causing a deleterious effect on the rising of the dough.

21 Claims, 1 Drawing Sheet

U.S. PATENT DOCUMENTS

| | | |
|---|---|---|
| 4,678,516 | 7/1987 | Alderman et al. . |
| 4,689,235 | 8/1987 | Barnes et al. . |
| 4,707,367 | 11/1987 | Miller et al. . |
| 4,820,534 | 4/1989 | Saleeb et al. . |
| 4,919,962 | 4/1990 | Arora et al. . |
| 4,999,208 | 3/1991 | Lengerich et al. . |
| 5,009,900 | 4/1991 | Levine et al. . |
| 5,087,461 | 2/1992 | Levine et al. . |
| 5,098,893 | 3/1992 | Franks et al. . |
| 5,124,162 | 6/1992 | Boskovic et al. . |
| 5,266,335 | 11/1993 | Cherukuri et al. . |
| 5,354,559 | 10/1994 | Morehouse . |
| 5,370,881 | 12/1994 | Fuisz . |
| 5,399,368 | 3/1995 | Garwood et al. . |
| 5,401,518 | 3/1995 | Adams et al. . |
| 5,536,513 | 7/1996 | Graf et al. ............... 426/92 |
| 5,601,760 | 2/1997 | Rosenberg ............... 264/4.1 |
| 5,601,865 | 2/1997 | Fulger et al. . |
| 5,603,971 | 2/1997 | Porzio et al. . |

# CONTROLLED RELEASE ENCAPSULATION COMPOSITIONS

BACKGROUND OF THE INVENTION

1. Field of the Invention

The present invention relates to encapsulation compositions for controlled release of the encapsulent in food products, such as dough products. The present invention also relates to foods which contain such an encapsulation composition, such as doughs containing such an encapsulation composition, and baked products prepared from such a dough.

2. Discussion of the Background

The baking industry is an important sector of the food industry. Bread and other yeast-raised bakery foods are widely consumed. These foods are desired due to their appealing flavor and light, porous texture, properties which depend largely on yeast fermentation, in addition to their nutritional value.

The production of leavened bread depends on two factors: (i) the ability of Baker's yeast (*Saccharomyces cerevisiae*) to generate carbon dioxide and alcohol through the breakdown of simple sugars; and (ii) the unique ability of wheat flour proteins to form films in dough that trap the evolved gases. Basic bread is made with flour, water, salt, and yeast. Incorporation of varying amounts of additional ingredients; altering the breadmaking process; shaping or cutting or putting toppings on the dough prior to baking; and varying the method of baking are all ways to achieve product variety. For example, raisin bread is made from a white-type bread dough with the addition of raisins and possibly spice. French bread is made from a lean white dough, shaped into a cylinder and baked on the hearth of a steam-filled oven. Pita bread is also made from a lean white dough, but it is shaped into thin, round pieces before baking in a hot (400° F.) oven. Sweet roll doughs are made with relatively high levels of sugar, fat, eggs, and yeast, and are shaped in various ways, with additional fillings and toppings to obtain the desired product. Other products which belong to the category of yeast-raised bakery foods include various kinds of specialty breads, coffee cakes and danish pastries, bagels, croissants, yeast-raised doughnuts, some types of crackers, English muffins, and rolls.

The primary ingredient of most bakery foods is wheat flour. This is especially true in breadmaking, where flour may comprise up to 95% of the ingredients, excluding water, in a lean bread dough. When the flour comes in contact with water in the dough, and mixing energy is applied, some of the proteins, mainly gluten, form elastic, gas-retaining films. Mixing the dough not only serves to distribute the ingredients homogeneously, but also develops a proper balance of viscoelastic properties in the gluten protein strands resulting in the ability to retain fermentation gases in numerous small gas cells. The dough, which is tough and relatively elastic after mixing, mellows and becomes more extensible during fermentation so that it is readily manipulated and shaped by appropriate machines and then baked into foods of good volume and quality.

However, it is known that the inclusion of certain flavors or ingredients in yeast-leavened doughs results in a deterioration of the rising properties of the dough and a corresponding deterioration of the final baked product. For example, cinnamon and cinnamon products traditionally are not added to yeast doughs since the cinnamon inhibits yeast growth. Cinnamic aldehyde, the major component of cinnamon oil, inhibits yeast metabolism, and consequently the formation of carbon dioxide. This leads to a lower loaf volume, as well as a denser texture. Practical baking texts and manuals report that cinnamon should not be used in dough but can be used as "roll-ins".

In general, bakeries might increase the amount of yeast in the formulation or may alter proofing times to compensate. Also cinnamon containing doughs are usually "sweet". Sweet doughs with their high osmotic strength are usually made with the freshest yeast possible.

Similar problems exist with the incorporation of other sweet spices including cloves, allspice, and nutmeg. Flavors from the allium family, including garlic and onion, also affect dough structure, and generally are not incorporated into the dough directly. The sulfur-containing compounds in those flavors are thought to interact with the disulfide moieties of the gluten as well as to affect yeast growth, which results in a reduced loaf volume and altered texture. These spices and flavors can have similar effects on the culturing of other fermented foods including cultured dairy products.

Protection of yeast and dough structures from added flavors is not the only area of concern for the food scientist. Some flavors incorporated into cultured or fermented products are particularly susceptible to degradation by the culturing microbes. For example, it is extremely difficult to produce an apple flavored bread product, because the leavening yeast catabolize the apple flavor as a source of nutrients. This also holds true in cultured dairy products. It is well known that added flavors generally have a limited shelf-life in fermented products such as yogurt, because the microbes use the flavors as a food source. This problem is exacerbated in reduced calorie fermented products, where simple carbohydrate nutrients are limiting.

The encapsulation of flavors and other active agents in a matrix of a food polymer is well known. For example, European Patent Application 0 180 551 A1 (1986) teaches the use of whey proteins to encapsulate volatile flavor components. Hydrolyzed milk is concentrated by heating and evaporation to 40–50% solids, which also results in the encapsulation with the whey proteins.

U.S. Pat. No. 4,232,047 teaches the preparation of a food supplement concentrate of an ingestible agent encased as a dispersed microphase in a matrix encapsulating medium, such as starch, protein, flour, modified starch, gum, or mixtures thereof. The concentrate is prepared by mixing the ingestible agent and the encapsulating medium with limited water to convert the mixture, under applied extrusion pressure and controlled heat. The only protein exemplified is gelatin.

Complex coacervation encapsulation, which yields oil droplets surrounded by a chemically crosslinked polymer film has been utilized for the encapsulation of cinnamon oil in chewing gums as disclosed in U.S. Pat. No. 5,266,335. Similar claims for a cinnamon oil encapsulated by complex coacervation for use in microwave breads is found in PCT Patent Application WO 93/1962 (D. Wampler and J. Soper, Aqueous Liquid Flavor Oil Capsules, Method of Making and Using in Foods).

U.S. Pat. No. 4,230,687 teaches a controlled-release product prepared by dispersing an active agent in an encapsulant, such as modified starch, a gum, or a protein material such as gelatin or casein to provide a concentrate of the active agent. The active agent is admixed with the matrix encapsulant with sufficient water to form a dough. The dough is formed into any desired shape and dried at low temperature. Active ingredient release is controlled by the hydration rate of the matrix.

Israeli Patent 43,506 demonstrates the use of a high protein vegetable encapsulating agent or carbohydrate vegetable encapsulating agent and a nutrient. The encapsulating agent is selected from cornflour, cottonseed flour, soybean flour, wheat flour, and wheat gluten flour. The ingredients are mixed and extruded under pressure. The extrudate expands due to flash evaporation, and the product is contained within the air spaces.

U.S. Pat. No. 3,857,964 discloses a controlled-release entity which is comprised of the reaction product of a polyhydric alcohol (glycerin) with cinnamic aldehyde, to form a cyclic acetal (2-(β-styryl)-1,3-dioxolane-4-methanol). This cyclic acetal was combined with non-reactive coating materials including alginate to form coated spheres, upon exposure to calcium lactate. These spheres were dried and then incorporated into a gum base for prolonged flavor release.

British Patent 1,249,250 discloses acid flavor compositions for use in tea bags or gelatin desserts which use a food-grade acid, a hardening agent such as a starch hydrolysate, a flavoring agent, and a binding agent such as glycerin.

Moreau, D. L., et al, in *Food Structure* vol. 12(4), pp. 457–468 (1993), teach that whey proteins and lactose can be used as wall systems for encapsulation of anhydrous milk fat.

Young, S. L., et al, in *J. Dairy Sci.*, vol. 76(10), pp. 2878–2885 (1993), demonstrate that whey proteins were strong emulsifiers of anhydrous milk fat, particularly in the presence of carbohydrates. Microencapsulation was greater than 96% by combining whey proteins and carbohydrates.

Maga, J. A., et al, in *Dev. Food Sci.* 29 (*Food Sci. Hum. Nutr.*), pp. 519–525, (1992) report the binding of C6, C8, and C10 acids, alcohols and aldehydes to low- and high-amylose corn starches and also soy and milk proteins. The products were extruded at 125° C. Starch, but not protein types, influenced retention of the flavors. Acids were bound more than alcohols. Aldehydes were bound the least.

Hansen, A. P., et al, in *J. Dairy Sci.*, vol. 74, pp. 2936–2940 (1991) report a dose response decrease in flavor intensity with increasing whey protein concentration.

Hansen, A. P., et al, in ACS Symposium Series: *Barrier. Polymer. Structure*, Chapter 17, pp. 318–332, 1990, point out that flavors may be lost due to interaction proteins as well as with the packaging material.

Ng, P. K. W., et al, in *J. Food Sci.*, vol. 54(1), pp. 105–107 (1989), demonstrate that the binding capacities of heat-treated fababean protein were higher than for that of native fababean proteins. Binding forces between vanillin and PMM were weak, and the number of binding sites increased when the plant protein was denatured.

O'Neill, T. E., et al, in *J. Food Sci.*, vol.53, pp. 906–909 (1988), report that thermal or chemical modification of β-lactoglobulin, a primary component in whey, decreased the binding affinity of the protein for 2-nonanone.

O'Neill, T. E., et al, in *J. Agric. Food Chem.*, vol. 38, pp. 770–774 (1987), disclose that the binding affinity of native β-lactoglobulin increases as flavor compounds become more nonpolar, the protein has one binding site per monomer, the protein can also bind non-specifically, and denaturation of the protein decreases the binding affinity of the protein.

O'Neill, T. E., et al, in *J. Food Sci.*, vol. 52, pp. 98–101, (1987), report that β-conglycinin, a protein fraction from soy, has a higher binding affinity for 2-nonanone compared to bovine serum albumin or β-lactoglobulin.

Noar, S. R., Reversible protein:flavor interactions and their effect on sensory perception. Dissertation Abstracts International, B. 46(9)2893: Order Number DA8525804 (1986), presents data showing that the binding of C6–C8 acetates and C8 and C9 ketones is directly related to the hydrophobicity of the soluble protein tested. No such relationship existed with insoluble proteins. Also, proteins lowered the perceived intensity of added flavor by 70–80%.

Dumont, J. P., et al, *J. Ag. and Food Chem.*, vol. 34(6), pp. 1041–1045 (1986), report that binding was reduced as the pH of pea protein decreased to the isoelectric point and postulate that diacetyl binds to arginyl residues of the protein.

Jasinski, E., et al, in *Milchwissenschaft*, vol. 40(10), pp. 596–599 (1985), report work done with native proteins. The largest number of binding sites with the strongest binding affinity was observed with whey protein concentrate.

Mills, O. E., et al, in *Lebensmittel-Wissenschaft und Technologie*, vol. 17(6), pp. 331–335 (1984), report work done with native protein and disclose that aldehydes may be bound to the epsilon-amino group of lysine, but the mechanism for ketones is probably different.

Arai, S., et al, in *Ag. and Biol. Chem.*, vol. 34(10), pp. 1569–1573 (1970), disclose that increasing denaturation of soy protein increased flavor binding, however, proteolysis decreased flavor binding.

However, there are no reports to date of cost-effective encapsulation compositions which permit the incorporation of a flavor or active agent in a yeast-leavened dough while at the same time protecting the dough from an effect of the flavor or active agent which would result in a deterioration of yeast growth or of the ability of the dough to rise. Thus, there remains a need for encapsulation compositions which permit the incorporation of a flavor or active agent in a yeast-risen dough without causing a deterioration of the ability of the dough to rise. There also remains a need for doughs which contain such an encapsulation composition and baked products prepared from such doughs.

Further, numerous other food systems have similar issues, in that flavors are required to be retained in aqueous systems without being released or exposed to their environment. Thus, there remains a need for encapsulation compositions which result in the controlled release of a flavor. In particular, there remains a need for encapsulation compositions which protect an encapsulated flavor or active ingredient from degradation by a microbe, such as yeast.

SUMMARY OF THE INVENTION

Accordingly, it is one object of the present invention to provide novel encapsulation compositions in which a flavor or active agent is encapsulated is a matrix.

It is another object of the present invention to provide encapsulation compositions which may be incorporated into a fermented food product to protect both the flavor and the culturing microbes from one another.

It is another object of the present invention to provide encapsulation compositions which may be incorporated in a dough and exhibit a reduced tendency to inhibit the rising of the dough.

It is another object of the present invention to provide a dough which contains such an encapsulation composition.

It is another object of the present invention to provide a baked product obtained by baking such a dough.

These and other objects, which will become apparent during the following detailed description, have been achieved by the inventors' discovery that encapsulation compositions in which a flavor or active agent is encapsulated in a matrix comprising whey protein protect the flavor or active agent and the yeast from one another and, in the case of yeast-leavened doughs, exhibit a reduced tendency to inhibit the rising of yeast-leavened doughs.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

Figure 1:
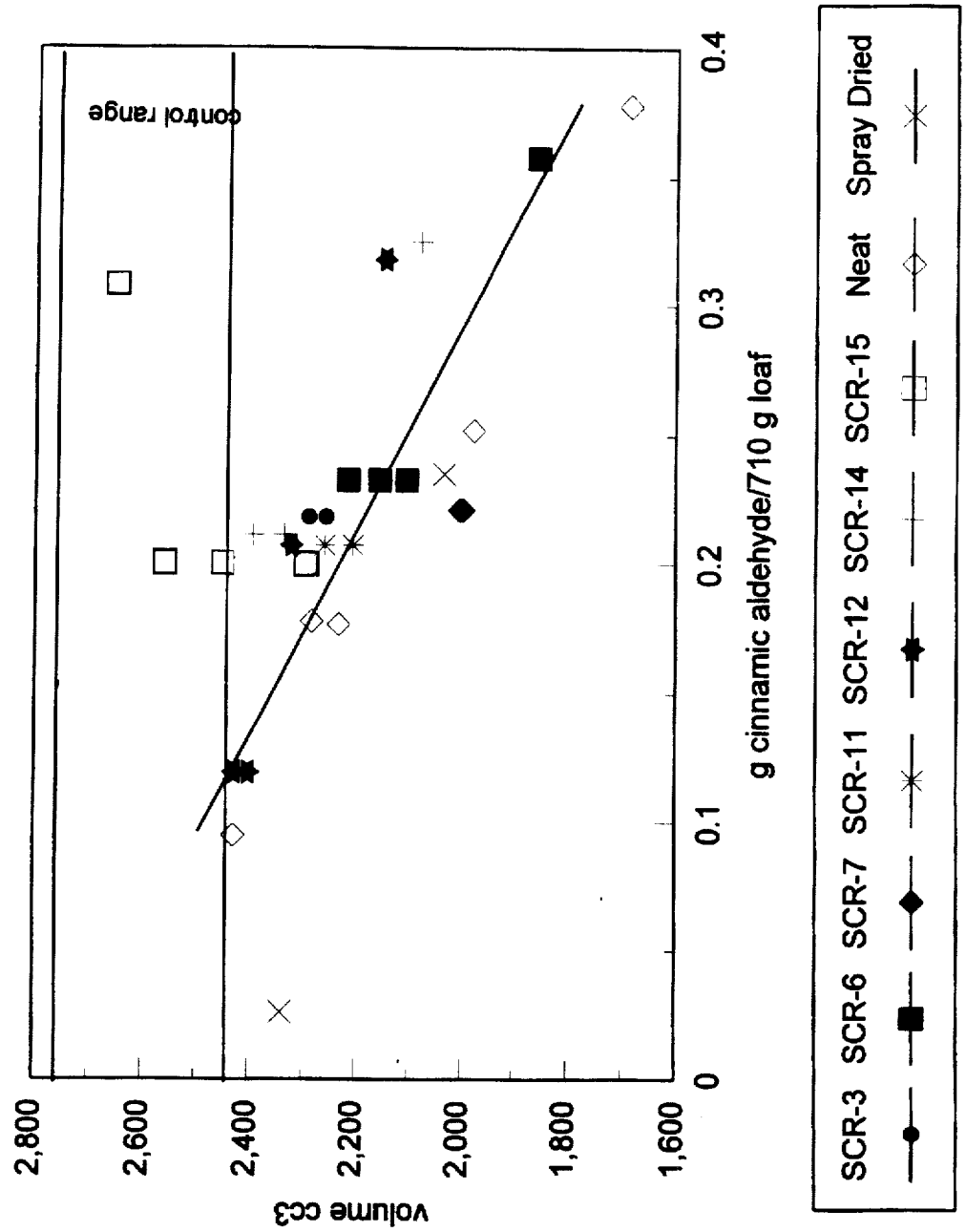
FIG. 1 shows the results of dough rising experiments in which a standard dough includes one of a variety of encapsulation compositions of cinnamic aldehyde in the concentration shown.

X axis: the amount of cinnamic aldehyde added to the dry ingredients prior to initial mixing of the dough. Y axis: loaf volume as measured by rapeseed displacement method.

The 'control range' is the mean bread volume ±2 standard deviations (approximately 95% confidence) for breads made with no added flavor.

Each symbol on the chart represents one loaf of bread. Duplicate experiments are shown as separate points. The negative slope line passes through the points for decreasing bread volume with increasing concentration of cinnamic aldehyde.

DETAILED DESCRIPTION OF THE PREFERRED EMBODIMENTS

Thus, in a first embodiment, the present invention provides encapsulation compositions in which a flavor or active agent is encapsulated in a glassy matrix which comprises whey protein. Examples of suitable flavors and active ingredients which may be encapsulated in the present encapsulation compositions include cinnamic aldehyde, eugenol, apple flavor, strawberry flavor, grape flavor, garlic flavor, onion flavor, diallyl disulfide, dipropyl disulfide, and dimethyl disulfide.

In a preferred embodiment, the flavor or active agent is one that would have a deleterious effect on the proofing of yeast-leavened dough if incorporated into the dough in an unencapsulated form. Particularly preferred flavors or active agents include cinnamic aldehyde, eugenol, garlic flavor, onion flavor, diallyl disulfide, dimethyl disulfide, and dipropyl disulfide.

Typically, the flavor or active agent will comprise from 0.5 to 20 wt. %, preferably from 1 to 10 wt. %, more preferably 3 to 7 wt. %, of the encapsulation composition, based on the total weight of the encapsulation composition.

As indicated above, the flavor or active agent is encapsulated in a matrix which comprises whey protein. Whey proteins are the dairy proteins that are released into the serum fraction during the renneting process of cheddar cheese production. The whey proteins, which are predominantly β-lactoglobulin and α-lactalbumin, generally are purified through a series of filtrations to remove lactose and other small molecular weight compounds. The purified proteins can be spray-dried to produce a powdered protein preparation. Whey protein isolate is commercially available from a variety of dairy products suppliers. The commercial supplier of the highest purity whey protein (trade name Bipro) is Davisco, Inc., LeSeur, Minn.

The matrix material can be essentially pure whey protein or may be a mixture of whey protein and other matrix components which do not detract from the good effects of the present encapsulation compositions. Typically, the matrix material will comprise at least 25 wt. %, preferably at least 50 wt. %, most preferably 100 wt. % of whey protein, based on the total weight of the matrix material. Examples of other matrix components which may be present in the matrix material include other food proteins, lipids, modified food starch, maltodextrin, dextrose, lactose, sucrose and other simple or complex carbohydrates. The matrix material will typically comprise from 80 to 99.5 wt. %, preferably 90 to 99 wt. %, more preferably from 93 to 97 wt. %, of the encapsulation composition, based on the total weight of the encapsulation composition. It may be possible to replace the whey protein with a protein which exhibits similar protective properties such as egg albumin.

The encapsulation composition should be in a form in which the flavor or active agent is dispersed in a matrix of the matrix material. Preferably, the flavor or active agent is microdispersed in a glassy matrix of the matrix material. This means that for flavors or active agents which are soluble in the matrix material (e.g., hydrophilic flavors and active agents), the active agent or flavor will be dissolved in the matrix material; while for flavors and active agents which are not soluble in the matrix material (e.g., hydrophobic flavors and active agents), the flavor or active agent will be dispersed in the matrix material. Preferably, the encapsulation composition will have a glass transition temperature, $T_g$, of at least 35° C., preferably at least 40° C.

The encapsulation compositions of the present invention may be conveniently prepared by forming a melt of the matrix material and the flavor or active agent in the heating zone of an extruder and extruding the melt. Such methods are described in U.S. patent application Serial Nos. 08/047,196 filed Apr. 16, 1993 now abandoned, 08/098,885 filed Jul. 29, 1993 now abandoned and 08/419,953 filed Apr. 10, 1995, now U.S. Pat. No. 5,601,865. Other drying processes leading to the glassy state, for example freeze drying or spray drying, may also be employed to form the encapsulation compositions.

Depending on the character and amount of flavor or active agent present, it may be desirable to utilize a plasticizer to facilitate the formation of the melt. Thus, for solid flavors or active agents, it may be necessary to use a plasticizer; while for liquid flavors or active agents, the use of a plasticizer is optional. Examples of suitable plasticizers include water and low molecular weight alcohols and polyols such as ethanol, glycerol, etc. Typically, the plasticizer may be used in an amount of 2 to 25 wt. %, preferably 3 to 20 wt. %, based on the weight of the matrix material. Of course, it is possible that the flavor or active agent may be in form which already contains a plasticizer, such as vanilla extract which contains ethanol.

The encapsulation composition is typically extruded from the extruder under ambient pressure. However, when using a volatile flavor or active agent, it may be desirable to extrude the encapsulation composition into a pressurized chamber or vessel to prevent loss of the flavor or active agent during cooling of the hot extruded composition.

After the extruded composition has cooled to room temperature, it may then be ground to an appropriate size for incorporation into a food, such as a dough. Suitably, the cooled composition is ground to a size of less than 10 mesh (Tyler Screen), preferably from 30 mesh to 120 mesh (Tyler Screen). In some cases it may be desirable to wash the ground encapsulation composition with a solvent in which the matrix material is insoluble but the flavor or active agent is soluble to remove any free flavor or active agent from the surfaces of ground encapsulation composition.

In a second embodiment, the present invention provides a dough composition which comprises an encapsulation composition of the present invention and a yeast-leavened dough. Typically, the present encapsulation composition will be present in an amount of from 0.02 to 20 wt. %, preferably 0.1 to 5 wt. %, based on the total weight of the dough composition.

Yeast-leavened doughs are described in *Kirk-Othmer Encyclopedia of Chemical Technology*, 4th Ed., John Wiley & Sons, New York, vol. 3, pp. 876–892 (1992). Thus, a yeast-leavened dough will typically contain from 40 to 80 wt. %, preferably from 50 to 70 wt. %, of wheat flour, based on the total weight of the yeast leavened dough. The yeast-leavened dough will also contain 0.5 to 5.0 wt. %, preferably from 0.75 to 2.5 wt. % of yeast based on the weight of the flour. The yeast may be fresh compressed yeast, granular yeast, or cream yeast. The yeast-leavened dough will also contain water in an amount of 20 to 80 wt. %, preferably 50 to 70 wt. %, based on the weight of the flour.

The yeast-leavened dough may optionally contain: (i) a yeast food in an amount of 0.1 to 1.0 wt. %, preferably 0.25 to 0.5 wt. %; (ii) sugar in an amount of 0.5 to 15 wt. %, preferably 1.5 to 10 wt. %; (iii) shortening in an amount of 2 to 12 wt. % preferably 3 to 9 wt. %; (iv) a surfactant in an amount of 1.0 to 10 wt. %, preferably 2.0 to 9.0 wt. %; (v) milk or a milk replacer in an amount of 1.0 to 20 wt. %, preferably 2.0 to 12 wt. %; (vi) eggs in an amount of 1.0 to 10 wt. %, preferably 2.0 to 9.0 wt. %; (vii) salt in an amount of 1.0 to 4.0 wt. %, preferably 2.0 to 2.5 wt. %; (viii) an enzyme in an amount of 0.15% to 0.5 wt. %, preferably 0.2 to 0.3 wt. %; (ix) a mold inhibitor in an amount of 0.01 to 0.5 wt. %, preferably 0.05 to 0.25 wt. %; (x) a nonencapsulated flavor in an amount of 0.5 to 20 wt. %, preferably 1.0 to 10 wt. %; and (xi) a non-encapsulated enriching ingredient in an amount of 0.01 to 1.0 wt. %, preferably 0.05 to 0.5 wt. %, all values based on the weight of the flour.

Examples of yeast food include ammonium salts, such as ammonium chloride, calcium salts, such as calcium sulfates, and oxidants such as potassium bromate. Suitable shortenings include animal and vegetable fats and oils, such as lard, hydrogenated vegetable shortenings, butter, and liquid soybean oil. Typical surfactants include monoglycerides and ethoxylated monoglycerides, calcium salts of fatty acids and lactic acid, polysorbates, succinylated monoglycerides, and diacetyl tartaric acid esters of monoglycerides. Either heat-treated liquid milk or nonfat dry milk may be used. Typical milk replacers contain soy flour or cereals, with whey, buttermilk solids, or sodium or calcium caseinate. Enzymes which may be included in the dough include amylolytic enzymes and proteolytic enzymes. Calcium propionate is the most common antimycotic used in yeast-leavened doughs. Flavors which may be incorporated in a nonencapsulated form include cocoa, chocolate, fruits and vegetables (fresh, frozen, canned, or dried). Nonencapsualted enriching ingredients include thiamine, riboflavin, iron, and calcium.

The dough may be prepared by any standard dough making procedure, such as the sponge and dough method, the straight dough methods and highly accelerated short-time methods including frozen dough processing, continuous mix, and liquid ferment processes. The present encapsulation compositions may be added directly to the yeast-leavened dough before the proofing without causing a negative effect on the ability of the dough to rise.

In a third embodiment, the present invention provides baked products produced by baking the present dough compositions. The present baked product may be a bread, cookie, cake, cracker, pastry, etc. The present baked products are characterized by good structure and volume.

Although the present invention will be described in more detail below in the context of a bread containing cinnamic aldehyde, it is to be understood that the good effects of the present invention will also be observed with other flavors or active agents than cinnamic aldehyde in other baked products than bread.

Cinnamic aldehyde encapsulated in a matrix composed of whey protein/maltodextrin/sucrose exhibits unique controlled release properties in yeast leavened dough products. The encapsulated flavor is prepared by mixing the flavor with the matrix ingredients and then melt-extruded using glycerin or water as a plasticizer. The resultant matrix has unexpected slow release properties compared to material that was not heated/extruded and also compared to products made using other proteins or carbohydrates as matrices.

While flavor binding by native proteins is known, there are no published data on the use of 'processed' whey proteins for protecting the flavor during processing. This functionality was demonstrated using a cinnamic aldehyde/bread loaf volume model (FIG. 1). Cinnamic aldehyde (CA) affects yeast growth, thus the use of cinnamon or cinnamon oil has been limited in yeast-leavened breads. CA, encapsulated by this technique, does not affect bread volume at normal or elevated CA concentrations. In addition, glycerin had a synergistic effect on the binding of the flavor, thus further inhibiting the release, as measured by release of the flavor over time in ambient temperature water (hydration test). In applications testing, the flavor intensity of applications made with the novel process flavor was comparable to products made with the same flavor in a neat or in a spray-dried form. Egg albumin and soy protein showed an incremental improvement in bread volume over the neat flavor, however these proteins were not as effective as whey proteins.

Matrices tested include modified corn starch, waxy dull modified corn starch, gelatin, egg albumin, whey protein concentrate, whey protein isolate and soy isolate. Samples encapsulated with these matrices were tested in an ambient temperature hydration model.

Results from the hydration model testing indicated that different matrices had varying degrees of flavor release at ambient temperatures. The bread model was used as a practical test to see if these results were reproducible in a functional model.

In another embodiment, the present invention provides a cultured dairy product which comprises an encapsulation composition according to the present invention. Suitable cultured dairy products include, e.g., yogurt. The production of cultured diary products is described in *Kirk-Othmer Encyclopedia of Chemical Technology*, 3rd Ed., Wiley, NY, vol. 15, pp. 522–570 (1981). Typically, the cultured dairy product of the present invention will contain from 0.05 to 5 wt. %, preferably from 0.1 to 2.5 wt. %, of the present encapsulation composition, based on the total weight of the cultured dairy product.

The present encapsulation compositions allow the use of ingredients in applications that currently do not permit their use. The primary industries that would benefit from this product would be the baking industry and cultured dairy products industry.

Other features of the invention will become apparent in the course of the following descriptions of exemplary embodiments which are given for illustration of the invention and are not intended to be limiting thereof.

EXAMPLES

Example 1

Matrices, composed of 50 wt. % matrix material (selected from Table 1), 25 wt. % sucrose and 25 wt. % maltodextrin (Lodex 10, American Maize Corporation, Hammond, Ind.) were blended by hand. The flavor (cinnamon flavor, composed of approximately 63% cinnamic aldehyde, F51397, McCormick & Company, Inc., Hunt Valley, Md.,) was plated on the dry matrix ingredients. The flavor containing matrix ingredients were mixed with sufficient plasticizer (water or glycerin) and heated under pressure, and the plastic mass was extruded, which quickly set up upon cooling. The resulting product was milled and sifted to obtain a standard particle size range for testing. The particle size range selected yielded material that passed through a 30 mesh Tyler screen and was retained on an 80 mesh Tyler screen. The flavor load was 27.6 mg (±1.4 mg)/g sample.

Control

Cinnamon flavor (F51397) was spray dried using Capsul M modified food starch as carrier (National Starch and Chemical Company, Inc., Bridgewater, N.J.). Flavor load was approximately 74 mg/g sample. The spray dried product was used as a control for comparison to the encapsulated products.

Hydration Test

All samples were tested for release of the flavor in ambient water as measured by increased UV absorbance at 280 nanometers over a thirty minute time period. Sample weight for all samples was 0.5 g encapsulated material in 200 g water. Gentle agitation was held constant at 100 rpm. Data for flavor release upon hydration are presented in Table 2.

Surface Flavor

All samples were tested for the amount of flavor that is easily released from the surface of the encapsulant by placing the encapsulated flavor in hexane, a non-polar solvent, and measuring the UV absorbance at 280 nanometers after thirty minutes. Sample weight for all samples was 5.0 g encapsulated material in 100 g hexane. Gentle agitation was held constant at 80 rpm. Data for surface flavor release are presented in Table 2. As can be seen from the data, the whey protein isolate (SCR-15) exhibits a low release of flavor on hydration and a low surface release regardless of plasticizer.

TABLE 1

| Code | Matrix Material | Supplier |
| --- | --- | --- |
| SCR-1 | Purity Gum BE (Modified Food Starch) | National Starch & Chemical Company, Inc., Bridgewater, NJ |
| SCR-2 | Flogel (Modified Food Starch) | National Starch & Chemical Company, Inc., Bridgewater, NJ |
| SCR-3 | Waxy Dull (Modified Food Starch) | American Maize Company, Inc., Chicago, IL |
| SCR-4 | Polargel C (Modified Food Starch) | American Maize Company, Inc., Chicago, IL |
| SCR-5 | Ultratex 4 (Modified Food Starch) | National Starch & Chemical Company, Inc., Bridgewater, NJ |
| SCR-6 | Capsul M (Modified Food Starch) | National Starch & Chemical Company, Inc., Bridgewater, NJ |
| SCR-7 | Gelatin, 300 Bloom | DynaGel, Calumet City, IL |
| SCR-9 | ProVim ESP (Vital Wheat Gluten) | ADM/Ogilvie, Decatur, IL |
| SCR-11 | Supro 710 (Soy Protein Isolate) | Protein Technologies, Inc. St. Louis, MO |
| SCR-12 | Egg Albumin | Henningsen Foods, Inc., Omaha, NE |
| SCR-13 | Acid Casein | Kerry Ingredients, Beloit, WI |
| SCR-14 | VersaPro (Whey Protein Concentrate 60% protein) | Davisco, Inc., LeSeur, MN |
| SCR-15 | BiPro, (Whey Protein Isolate, 95% protein) | Davisco, Inc., Leseur, MN |

TABLE 2

| | Glycerin | | Water | |
| --- | --- | --- | --- | --- |
| Plasticizer Matrix Code | Hydration Flavor Release (mg flavor/ g sample) | Surface Flavor Release (mg flavor/ g sample) | Hydration Flavor Release (mg flavor/ g sample) | Surface Flavor Release (mg flavor/ g sample) |
| SCR-1 | 29.7 | 1.0 | 26.3 | 0.5 |
| SCR-2 | 25.7 | 5.2 | 25.6 | 6.7 |
| SCR-3 | 26.0 | 2.0 | 28.4 | 2.0 |
| SCR-4 | 28.5 | 2.7 | 26.1 | 3.4 |
| SCR-5 | 27.5 | 3.6 | 28.0 | 3.7 |
| SCR-6 | 27.6 | 0.4 | 21.6 | 3.7 |
| SCR-7 | 22.7 | 1.8 | — | — |
| SCR-9 | 23.9 | 1.2 | — | — |
| SCR-11 | 19.3 | 0.1 | 25.6 | 0.01 |
| SCR-12 | 12.0 | 0.05 | 12.7 | 0.04 |
| SCR-13 | 19.5 | 4.7 | 19.3 | 4.6 |
| SCR-14 | 20.5 | 1.3 | 25.1 | 0.1 |
| SCR-15 | 9.5 | 0.01 | 19.0 | 0.05 |
| Spray Dried | | | 73.7 | 0.5 |

Example 2

A dose-dependent response of decreasing bread volume with incorporation of increasing cinnamic aldehyde content was confirmed (FIG. 1, codes as described in Table 1). This dose-dependent response was noted when the flavor was in the neat, the carbohydrate-encapsulated form, and also with some protein-based encapsulants (gelatin, gluten) when evaluated at equivalent flavor levels. Bread loaf volume was not affected with the encapsulated flavor from the whey protein matrix. Sensory tests indicated that the cinnamon flavor was still available for flavor impact. Cinnamon flavor strength in the breads was equivalent, regardless of the encapsulation matrix used.

Encapsulated Products

Encapsulated products were prepared as outlined in Example 1. For consistency, only samples using glycerin as plasticizer were used in the test.

Breads

An automatic bread baker was used in the study to minimize variability in kneading time and technique, proofing and baking. This model was not selected to be representative of the conditions in an industrial bakery but to minimize variability in the study.

Yeast 2 cases (same lot) of 4 ounce jars of Fleischmann's yeast were obtained from the manufacturer. The yeast was held at room temperature. When needed, a new jar was opened and held at 4° C. Several control breads were made when a new jar of yeast was opened.

Flour

Several lots of Pillsbury Bread Flour (retail product) were blended together to ensure a uniform flour supply.

A DAK Turbo Baker IV home bread maker (DAK, Inc., Minneapolis, Minn.) was used for all tests. A modified white bread formulation was used:

| | |
|---|---|
| Yeast, Fleischmann's | 7.0 g |
| Pillsbury Bread Flour | 375.0 g |
| Granulated sugar | 14.2 g |
| Salt | 5.6 g |
| Non Fat Dried Milk solids | 14.2 g |
| Crisco hydrogenated shortening | 11.8 g |
| Water, 110° F. | 279.0 g |
| | 706.8 g |

Dry cinnamon products were blended with the flour. Oil-soluble cinnamon products were blended with the shortening. The ingredients were added to the mixing/baking pan in the order listed.

Bread Volume Measurement

Bread volume was determined using a modified rapeseed displacement method.

Determination of Sample Levels

Cinnamic aldehyde was extracted by traditional volatile oil extraction, and the concentration was quantified in the encapsulated products by gas chromatography, except for the samples using whey protein isolate. Traditional volatile oil extraction techniques were not effective at releasing the cinnamic aldehyde for quanitation, therefore cinnamic aldehyde levels for the whey protein isolate samples were determined by formulation.

Determination of "Control Range"

At the onset, and periodically throughout the study, blank controls were prepared. The blank volumes were averaged, and a control range equal to the mean plus or minus 2 times the standard deviation was calculated.

Data are presented in FIG. 1. Volumes greater than 2371 $cc^3$ are in the control range. The sample prepared with whey protein isolate (WPI) showed no decrease in volume with increasing levels of cinnamic aldehyde. Flavor strength was not significantly affected in the WPI.

A deleterious effect was seen with the use of the gelatin encapsulated sample. Gluten integrity was lost during kneading. This is the only sample where any noticeable effect on gluten was observed.

In this model, yeast is protected from cinnamic aldehyde when a WPI encapsulated cinnamon oleoresin and oil is used. None of the other encapsulants tested at levels known to affect bread volume produced breads in the control range. All of the other encapsulants, with the exception of gelatin, improved bread volume slightly over the neat flavor. These results parallel those observed with the hydration test.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters: patent of the United States is:

1. An encapsulation composition comprising:
   (a) a flavor or active agent encapsulated in
   (b) a matrix comprising whey protein, wherein said flavor or active agent comprises cinnamic aldehyde.

2. The encapsulation composition of claim 1, wherein said cinnamic aldehyde is present in said encapsulation composition in an amount of 0.5 to 20 wt. % based on the total weight of said encapsulation composition.

3. The encapsulation composition of claim 1, wherein said cinnamic aldehyde is present in said encapsulation composition in an amount of 1 to 10 wt. %, based on the total weight of said encapsulation composition.

4. The encapsulation composition of claim 1, wherein said cinnamic aldehyde is present in said encapsulation composition in an amount of 0.5 to 20 wt. %, based on the total weight of said encapsulation composition, and said matrix comprises at least 25 wt. % of whey protein isolate, based on the total weight of said matrix.

5. The encapsulation composition of claim 11, wherein said matrix comprises at least 25 wt. % of whey protein isolate, based on the total weight of the matrix.

6. The encapsulation composition of claim 1, wherein said matrix is glassy.

7. A dough composition, comprising:
   (A) an encapsulation composition, which comprises:
      (a) a flavor or active agent encapsulated in
      (b) a matrix comprising whey protein; and
   (B) a yeast-leavened dough,
   wherein said flavor or active agent comprises cinnamic aldehyde.

8. The dough composition of claim 7, wherein said cinnamic aldehyde is present in said encapsulation composition in an amount of 0.5 to 20 wt. %, based on the total weight of said encapsulation composition.

9. The dough composition of claim 7, wherein said cinnamic aldehyde is present in said encapsulation composition in an amount of 1 to 10 wt. %, based on the total weight of said encapsulation composition.

10. The dough composition of claim 7, wherein said cinnamic aldehyde is present in said encapsulation composition in an amount of 0.5 to 20 wt. %, based on the total weight of said encapsulation composition, and said matrix comprises at least 25 wt. % of whey protein isolate, based on the total weight of said matrix.

11. The dough composition of claim 7, wherein said matrix comprises at least 25 wt. % of whey protein isolate, based on the total weight of the matrix.

12. The dough composition of claim 7, wherein said yeast-leavened dough comprises wheat flour, yeast, and water.

13. The dough composition of claim 7, wherein said matrix is glassy.

14. A baked product, prepared by baking a dough composition, comprising:
   (A) an encapsulation composition, which comprises:
      (a) a flavor or active agent encapsulated in
      (b) a matrix comprising whey protein; and
   (B) a yeast-leavened dough,
   wherein said flavor or active agent comprises cinnamic aldehyde.

15. The baked product of claim 14, wherein said cinnamic aldehyde is present in said encapsulation composition in an amount of 0.5 to 20 wt. %, based on the total weight of said encapsulation composition.

16. The baked product of claim 14, wherein said cinnamic aldehyde is present in said encapsulation composition in an amount of 1 to 10 wt. %, based on the total weight of said encapsulation composition.

17. The baked product of claim 14, wherein said cinnamic aldehyde is present in said encapsulation composition in an amount of 0.5 to 20 wt. %, based on the total weight of said encapsulation composition, and said matrix comprises at least 25 wt. % of whey protein isolate, based on the total weight of said matrix.

18. The baked product of claim 14, which is selected from the group consisting of breads, cookies, crackers, cakes, pastries, bagels, rolls, English muffins, croissants, and yeast-raised doughnuts.

19. The baked product of claim 14, wherein said matrix comprises at least 25 wt. % of whey protein isolate, based on the total weight of the matrix.

20. The baked product of claim 14, wherein said yeast-leavened dough comprises wheat flour, yeast, and water.

21. The baked product of claim 14, wherein said matrix is glassy.

* * * * *